United States Patent [19]

Itoh

[11] Patent Number: 5,438,428
[45] Date of Patent: Aug. 1, 1995

[54] DATA STORAGE DEVICE WITH SELECTABLE TYPE DATA STORAGES

[75] Inventor: Shingo Itoh, Inazawa, Japan

[73] Assignee: Brother Kogyo Kabushiki Kiasha, Nagoya, Japan

[21] Appl. No.: 223,963

[22] Filed: Apr. 6, 1994

[30] Foreign Application Priority Data

Apr. 15, 1993 [JP] Japan .................. 5-114033

[51] Int. Cl.$^6$ .................. H04N 1/21; H04N 1/32; H04M 11/06
[52] U.S. Cl. .................. 358/436; 358/444; 358/468; 379/100
[58] Field of Search .................. 358/403, 402, 407, 404, 358/444, 434, 443, 435, 436, 437, 438, 439, 440, 400, 442, 468; 379/100

[56] References Cited

U.S. PATENT DOCUMENTS

| 5,159,624 | 10/1992 | Makita | 379/100 |
| 5,357,562 | 10/1994 | Metser | 379/100 |

FOREIGN PATENT DOCUMENTS

| 190470 | 8/1988 | Japan | H04N 1/21 |
| 233648 | 9/1988 | Japan | H04M 11/00 |
| 54873 | 3/1989 | Japan | H04N 1/21 |
| 191560 | 8/1989 | Japan | H04N 1/21 |
| 36868 | 2/1991 | Japan | H04N 1/21 |
| 9004299 | 4/1990 | WIPO | H04M 11/00 |

*Primary Examiner*—Scott A. Rogers
*Attorney, Agent, or Firm*—Oliff & Berridge

[57] ABSTRACT

A data storage device is designed so that voice digital data and image digital data are stored into a voice/image memory thereof. The type of digital data to be stored into the voice/image memory is indicated by manipulating a record key or a play key, and a set key. Through this operation, only digital data of the type is indicated is stored into the voice/image memory.

14 Claims, 11 Drawing Sheets

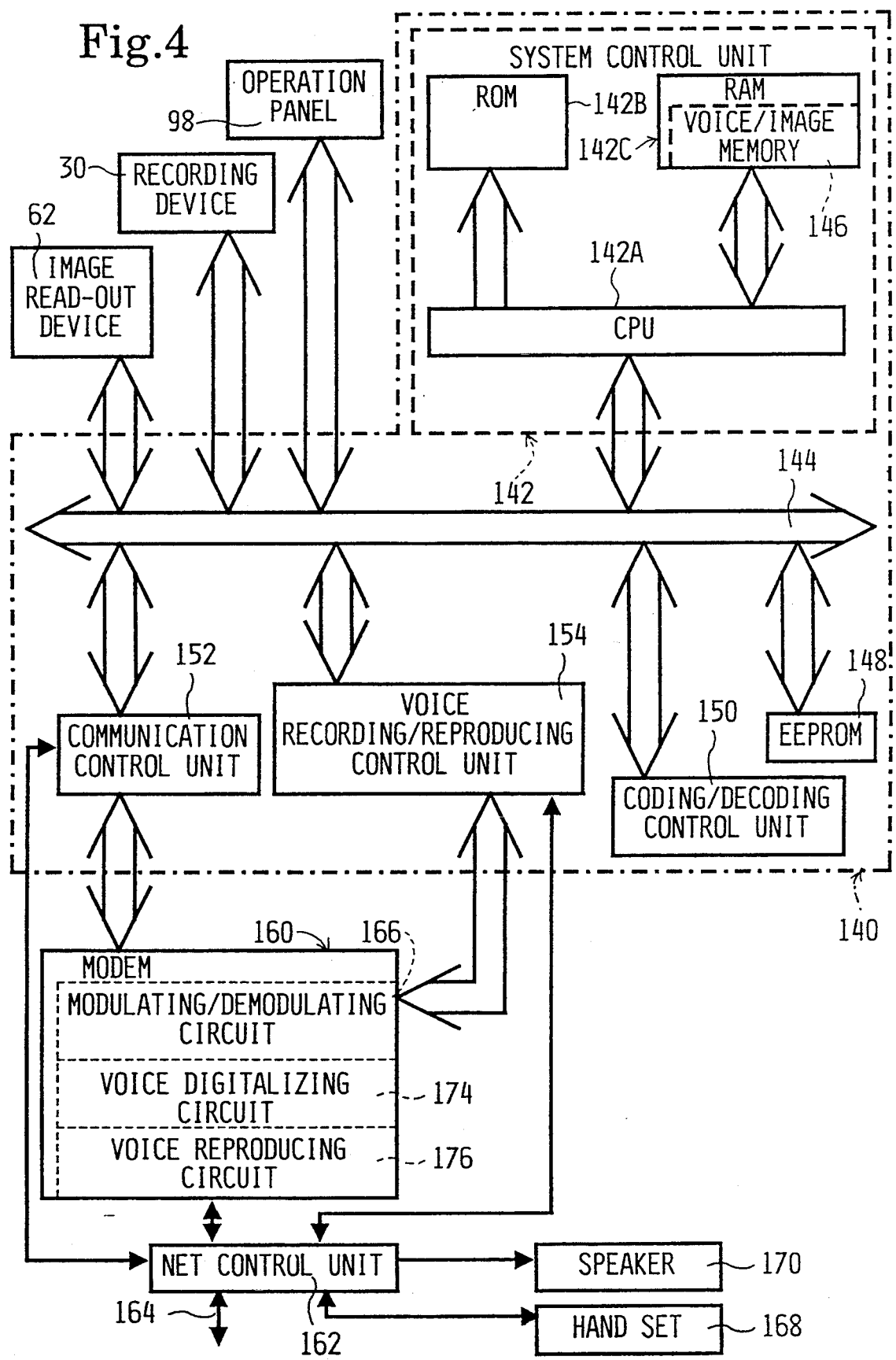

FIG. 5B

| Step | Action |
|---|---|
| STORED DATA INDICATING ROUTINE ||
| S1 | STORAGE INSTRUCTION FOR ONLY VOICE DIGITAL DATA? |
| S2 | INDICATION POSSIBLE? |
| S3 | DISPLAY "INDICATION IMPOSSIBLE" ON LCD |
| S4 | STORE INTO EEPROM STORAGE INDICATION OF ONLY VOICE DIGITAL DATA |
| S5 | STORAGE INSTRUCTION FOR ONLY IMAGE DIGITAL DATA? |
| S6 | INDICATION POSSIBLE? |
| S7 | DISPLAY "INDICATION IMPOSSIBLE" ON LCD |
| S8 | STORE INTO EEPROM STORAGE INDICATION OF ONLY IMAGE DIGITAL DATA |
| S9 | STORAGE INSTRUCTION FOR VOICE AND IMAGE DIGITAL DATA? |
| S10 | STORE INTO EEPROM STORAGE INDICATION OF VOICE AND IMAGE DIGITAL DATA |
| S11 | CANCEL? |
|  | END |

FIG. 6B

| Step | Action |
|---|---|
| \multicolumn{2}{c}{STORAGE-INDICATED DATA DISPLAYING ROUTINE} |
| S101 | AUTOMATICALLY ANSWERING TELEPHONE MODE? |
| S102 | STORAGE INSTRUCTION FOR ONLY VOICE DIGITAL DATA? |
| S103 | INDICATION OF STORAGE INSTRUCTION FOR ONLY VOICE DIGITAL DATA DISPLAYED? |
| S104 | DISPLAY INDICATION OF STORAGE INSTRUCTION FOR ONLY VOICE DIGITAL DATA |
| S105 | STORAGE INSTRUCTION FOR ONLY IMAGE DIGITAL DATA? |
| S106 | INDICATION OF STORAGE INSTRUCTION FOR ONLY IMAGE DIGITAL DATA DISPLAYED? |
| S107 | DISPLAY INDICATION OF STORAGE INSTRUCTION FOR ONLY IMAGE DIGITAL DATA |
| S108 | INDICATION OF STORAGE INSTRUCTION FOR VOICE DIGITAL DATA AND IMAGE DIGITAL DATA DISPLAYED? |
| S109 | DISPLAY INDICATION OF STORAGE INSTRUCTION FOR VOICE DIGITAL DATA AND IMAGE DIGITAL DATA |
| S110 | DISPLAY KIND OF CURRENTLY-STORED DIGITAL DATA |
|  | END |

Fig.9

| TYPE OF STORAGE-INSTRUCTED DIGITAL DATA AND STORAGE STATUS OF DIGITAL DATA | VOICE LAMP | DOCUMENT LAMP |
|---|---|---|
| STORAGE INSTRUCTION OF VOICE DIGITAL DATA<br>NO STORAGE OF VOICE DIGITAL DATA | TURN ON | TURN OFF |
| STORAGE INSTRUCTION OF ONLY VOICE DIGITAL DATA<br>STORAGE OF VOICE DIGITAL DATA | TURN ON-AND-OFF | TURN OFF |
| STORAGE INSTRUCTION OF ONLY IMAGE DIGITAL DATA<br>NO STORAGE OF IMAGE DIGITAL DATA | TURN OFF | TURN ON |
| STORAGE INSTRUCTION OF ONLY IMAGE DIGITAL DATA<br>STORAGE OF IMAGE DIGITAL DATA | TURN OFF | TURN ON-AND-OFF |
| STORAGE INSTRUCTION OF VOICE DIGITAL DATA AND IMAGE DIGITAL DATA<br>NO STORAGE OF VOICE DIGITAL DATA<br>NO STORAGE OF IMAGE DIGITAL DATA | TURN ON | TURN ON |
| STORAGE INSTRUCTION OF VOICE DIGITAL DATA AND IMAGE DIGITAL DATA<br>STORAGE OF VOICE DIGITAL DATA<br>NO STORAGE OF IMAGE DIGITAL DATA | TURN ON-AND-OFF | TURN ON |
| STORAGE INSTRUCTION OF VOICE DIGITAL DATA AND IMAGE DIGITAL DATA<br>NO STORAGE OF VOICE DIGITAL DATA<br>STORAGE OF IMAGE DIGITAL DATA | TURN ON | TURN ON-AND-OFF |
| STORAGE INSTRUCTION OF VOICE DIGITAL DATA AND IMAGE DIGITAL DATA<br>STORAGE OF VOICE DIGITAL DATA<br>STORAGE OF IMAGE DIGITAL DATA | TURN ON-AND-OFF | TURN ON-AND-OFF |

DATA STORAGE DEVICE WITH SELECTABLE TYPE DATA STORAGES

BACKGROUND OF THE INVENTION

1. Field of the Invention

This invention relates to a device for storing data in digital form, and particularly to a device capable of indicating the kind of digital data to be stored.

2. Description of Related Art

Digital data storage devices are known for storing both voice digital data and image digital data. For example, a facsimile machine equipped with an automatic telephone message recorder (automatically answering telephone) is disclosed in U.S. Pat. No. 5,018,186 and Japanese Laid-open Patent Application No. 1-286671, in which image data are received by the facsimile machine and voice data are received by the automatically answering telephone. The received data are stored in a data storage device provided in the facsimile machine.

In such a storage device, problems occur at any time when both voice digital data and image digital data are stored into the device. For example, they occur in a case where a facsimile machine having an automatically answering machine is used after being further connected to an automatically answering telephone. When the facsimile machine having the automatically answering machine is connected to the automatically answering telephone, the facsimile machine is regarded as having two telephones. In this case, for example when the facsimile machine having the automatically answering machine is located in a study and the automatically answering telephone is located at a different location, the following advantage can be obtained. That is, image digital data transmitted from an external source can be received by the facsimile machine in the study and a telephone call can be caught at either one of the two different places. However, in this case, the automatically answering telephone is generally designed to have a voice data storage device and, thus, it can store voice digital data. Accordingly, it is inefficient to doubly store the voice digital data into a voice data storage device which is equipped in the facsimile machine having the automatically answering machine.

Further, there occurs a disadvantage when the facsimile machine having the automatically answering machine is used alone. For example, when a storage device cannot be used exclusively for storage of image digital data although the user knows that a large amount of image digital data will be transmitted to the facsimile machine during his/her absence and the whole storage area of the data storage device must be used to store the image digital data, the storage area is reduced in the reception of the image digital data by the automatically answering machine of the facsimile machine. Thus, a desired amount of image digital data cannot be received. The same disadvantage occurs for the case where a large number of voice message or a large amount of voice data is expected and images messages are received.

SUMMARY OF THE INVENTION

An object of this invention is to provide a data storage device capable of indicating the kind of digital data to be stored.

In order to attain the above object, the data storage device according to the invention includes digital data storing means for storing both voice digital data representing voice messages and image digital data representing image messages or transmissions, and storage mode indicating means capable of conducting a selective storage mode indication of at least two storage modes of three storage modes: a first storage mode in which the type of the digital data to be stored in the digital data storing means is limited to only voice digital data, a second storage mode in which the type of the digital data to be stored in the digital data storing means is limited to only image digital data and a third storage mode in which the type of the digital data to be stored in the digital data storing means is both voice digital data and image digital data.

The data storage device according to the invention may further include storage-indicated data display means for displaying the type of digital data which is to be stored in a storage mode indicated by the storage mode indicating means.

The data storage device according to the invention may further include currently-stored data display means for displaying the type of digital data which is currently stored in the digital data storing means.

The data storage device thus structured can be actuated in four operation modes in accordance with the storage modes which are selected from the three storage modes by the storage mode indicating means. In each operation mode, digital data which meet the storage mode indicated by the storage mode indicating means are stored in the digital data storing means. That is, when the storage mode indicating means can selectively indicate the first and second storage modes, the digital data storing means stores only the voice digital data or only image digital data respectively.

When the storage mode indicating means can selectively indicate the first and third storage mode, the digital data storing means stores only voice digital data or both voice digital data and image digital data.

When the storage mode indicating means can selectively indicate the second and third storage mode, the digital data storing means stores only image digital data or both voice digital data and image digital data.

When the storage mode indicating means can selectively indicate the first, second and third storage modes, the digital data storing means stores only voice digital data, or only image digital data, or both of voice digital data and image digital data.

In the data storage device having the storage-indicated display means according to the invention, the type of the digital data which is stored in the storage mode indicated by the storage mode indicating means is displayed by the storage-indicated data display means. When the first storage mode is indicated, the storage of only voice digital data is displayed. When the second storage mode is indicated, the storage of only image digital data is displayed. When the third storage mode is indicated, the storage of both voice and image digital data is displayed.

The type of the digital data to be stored may be displayed with a lamp as described later, or may be displayed in various other ways, such as using characters, symbols and figures (patterns) on a visual display means, such as a liquid crystal display, or by using voice or a sentence.

According to the data storage device having the currently-stored data display means, the type of digital data which is currently stored in the digital data storing means is displayed by the currently-stored data display means. Further, the type of currently-stored digital data may be also displayed in the same ways as the display of the type of the storage-instructed digital data.

As described above, according to the invention, the digital data storing means stores the digital data which correspond to the storage mode indicated by the storage mode indicating means, that is, only voice digital data, only image digital data or both voice digital data and image digital data.

Accordingly, for example, when the facsimile machine having the automatically answering machine is used while connected to the automatically answering telephone, the digital data storing means of the data storage device of the facsimile machine having the automatically answering machine can be used only for the storage of the image digital data. Further, when the facsimile machine having the automatically answering machine is used alone, by using the digital data storing means only for the storage of image digital data, a large amount of image digital data can be received. Similarly, a large amount of voice digital data can be stored when the digital data storing means is dedicated to storing voice digital data.

In addition to the effects as described above, according to the data storage device having the storage-indicated data display means, the user can know at a glance which one of the voice and image digital data can be stored in the digital data storing means because the type of digital data to be stored in the indicated storage mode is displayed. Thus, it is easy for the operator to alter the kind of the digital data to be stored. As a result, this data storage device is more convenient to use than prior art devices.

Further, in addition to the above effects, according to the data storage device having the currently-stored data display means, the user can easily know the type of the digital data which is currently stored in the digital data storing means, so that the retrieval operation of the stored data can be easily performed.

BRIEF DESCRIPTION OF THE DRAWINGS

A preferred embodiment of the invention will be described in detail with reference to the following figures, wherein:

FIG. 4 is a block diagram showing a control device for the facsimile machine shown in FIG. 1;

FIG. 5B is a table of labels for FIG. 5A;

FIG. 6B is a table of labels for FIG. 6A;

FIG. 9 is a table showing combinations of turn-on and turn-off of a lamp which represent the kind of the digital data for which the storage is indicated by the facsimile machine and the kind of the digital data which are currently stored.

DETAILED DESCRIPTION OF THE PREFERRED EMBODIMENT

A preferred embodiment in which the invention is applied to a facsimile machine equipped with an automatically answering machine (telephone) will be hereunder described with reference to the accompanying drawings.

Figure 1:
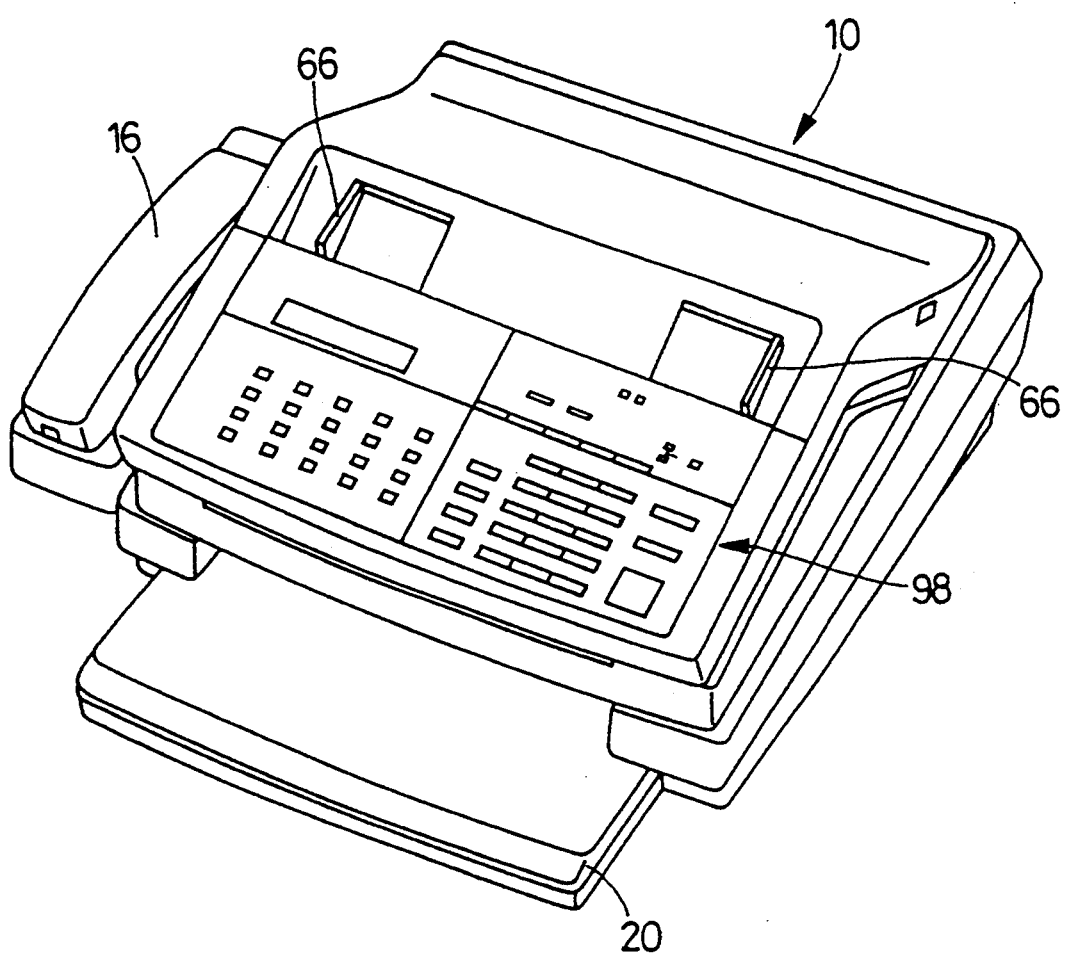
FIG. 1 is a perspective view showing the outline of a facsimile machine equipped with a data storage device according to one embodiment of the invention.

FIG. 1 shows the outline of a facsimile machine equipped with an automatically answering telephone.

Figure 2:
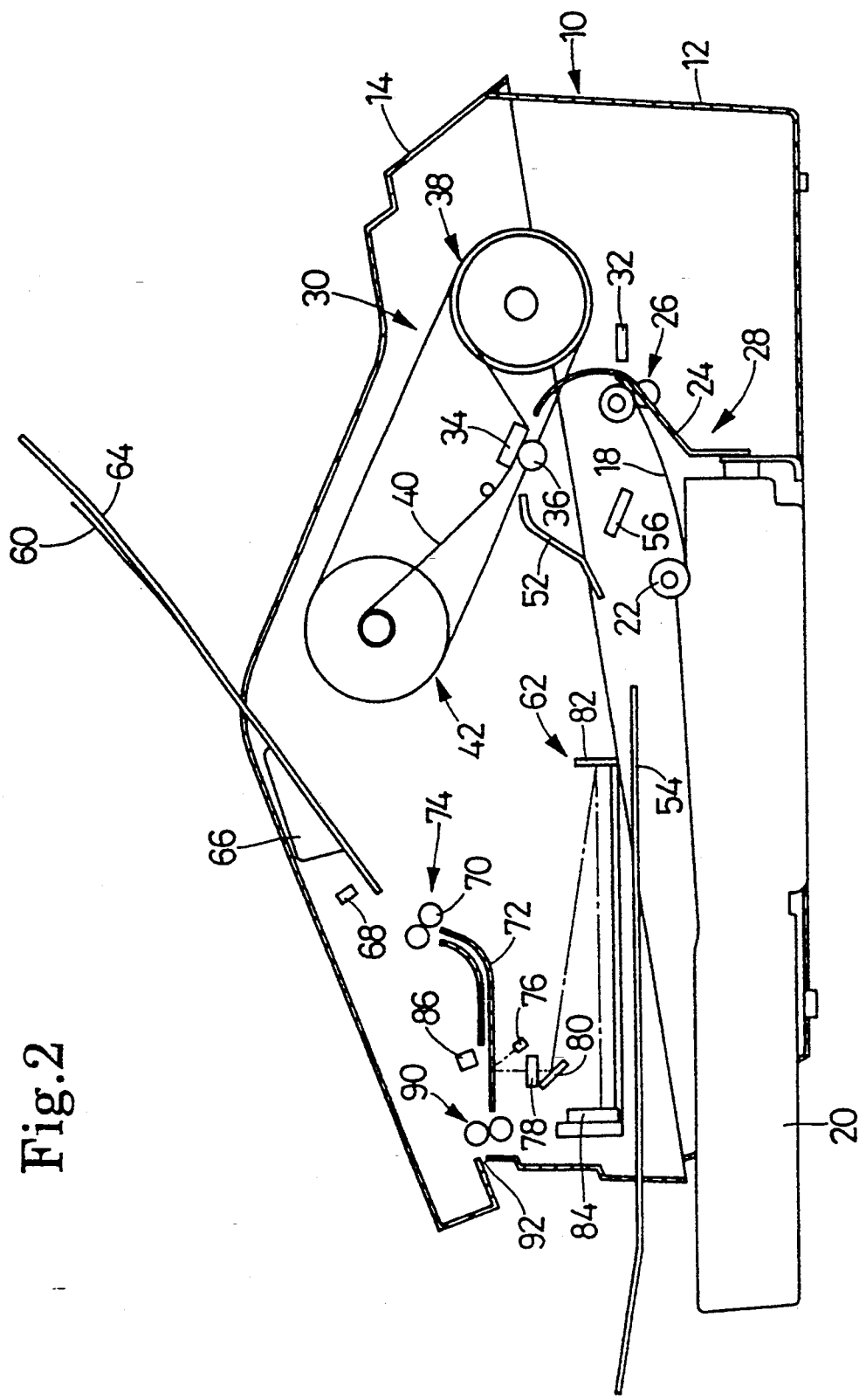
FIG. 2 is a side, cross-sectional view of the facsimile machine shown in FIG. 1.

A main body 10 of the facsimile machine includes a vessel-shaped lower cover 12 and an upper cover 14 disposed so as to cover the lower cover 12 as shown in FIG. 2.

A telephone receiver 16 is secured to the lower cover 12 as shown in FIG. 1, and a recording sheet cassette 20 for stocking a large number of recording sheets 18, serving as recording medium, is set inside of the lower cover 12 as shown in FIG. 2. The recording sheets 18 are fed one by one from the recording sheet cassette 20 by a sheet supply roller 22, and then fed to a recording device 30, by a recording sheet feeding device 28 comprising a paper guide 24 and a pair of feeding rollers 26, to form an image, such as characters and figures (patterns). Reference numeral 32 represents a sheet detection sensor. It serves to detect the leading edge of the recording sheet 18 as fed from the recording sheet cassette 20. On the basis of the detection, a recording start timing of the recording device 30 is determined.

The recording device 30 is provided inside of the upper cover 14. The recording device 30 includes a recording head 34, a platen 36 which is rotatably disposed to confront the recording head 34, and an ink ribbon device 38. The recording head 34 is of a thermal type and includes a large number of heating elements which are arranged on a row in a direction perpendicular to a feeding direction of the recording sheet 18. The platen 36 is rotated around a center axis by a driving device (not shown) to feed the recording sheet 18.

The ink ribbon device 38 includes a thermosensitive ink ribbon 40 whose width corresponds to a recording range of the recording head 34 and an ink ribbon feeding device 42 for feeding the thermosensitive ink ribbon 40. The thermosensitive ink ribbon 40 is fed in synchronism with the recording sheet 18. An image is recorded on the recording sheet 18 through a pressing contact of the thermosensitive ink ribbon 40 with the recording sheet 18 and a heating operation of the heating elements. The recording sheet 18 having the image recorded thereon is guided by the paper guide 52 to a sheet discharge stand 54 and discharged to the outside of the apparatus. Reference numeral 56 represents a sheet discharge sensor. In a case where a recording operation is continuously conducted on plural recording sheets, after it is detected by the recording sheet discharge sensor 56 that a recording sheet 18 having an image formed thereon is completely discharged, the feed-out operation of a next recording sheet 18 from the recording sheet cassette 20 is started, thereby avoiding sheet jams.

Inside of the upper cover 14 an image read-out device 62 is provided for reading out an image which is recorded on an original to be transmitted. The original 60 is mounted on an original receiving tray 64 which is detachably secured to the upper cover 14, and it is set in the gap between a pair of original guides 66 as shown in FIG. 1. The leading edge of the set original 60 is detected by an original sensor 68 provided inside of the upper cover 14. On the basis of a read-out start instruction, the original 60 is fed one sheet at a time to the image read-out device by an original feeding device 74 comprising a pair of original sheet supply rollers 70 and a paper guide 72.

In the image read-out device 62, light is irradiated onto the original 60 by a light source 76 and the light reflected from the original 60 is focused by a lens 78. The focused light is reflected by mirrors 80 and 82 to be incident into a line image sensor 84, thereby reading out the image found on the original 60 line by line. Reference numeral 86 represents a sensor for detecting the leading edge of the original 60. The line image sensor 84 is controlled on the basis of the detection of the leading edge of the original 60 by the original leading edge sensor 86. After the read-out operation, the original 60 is fed by a pair of discharge rollers 90 to be discharged through an opening 92 formed in the upper cover 14.

Figure 3:
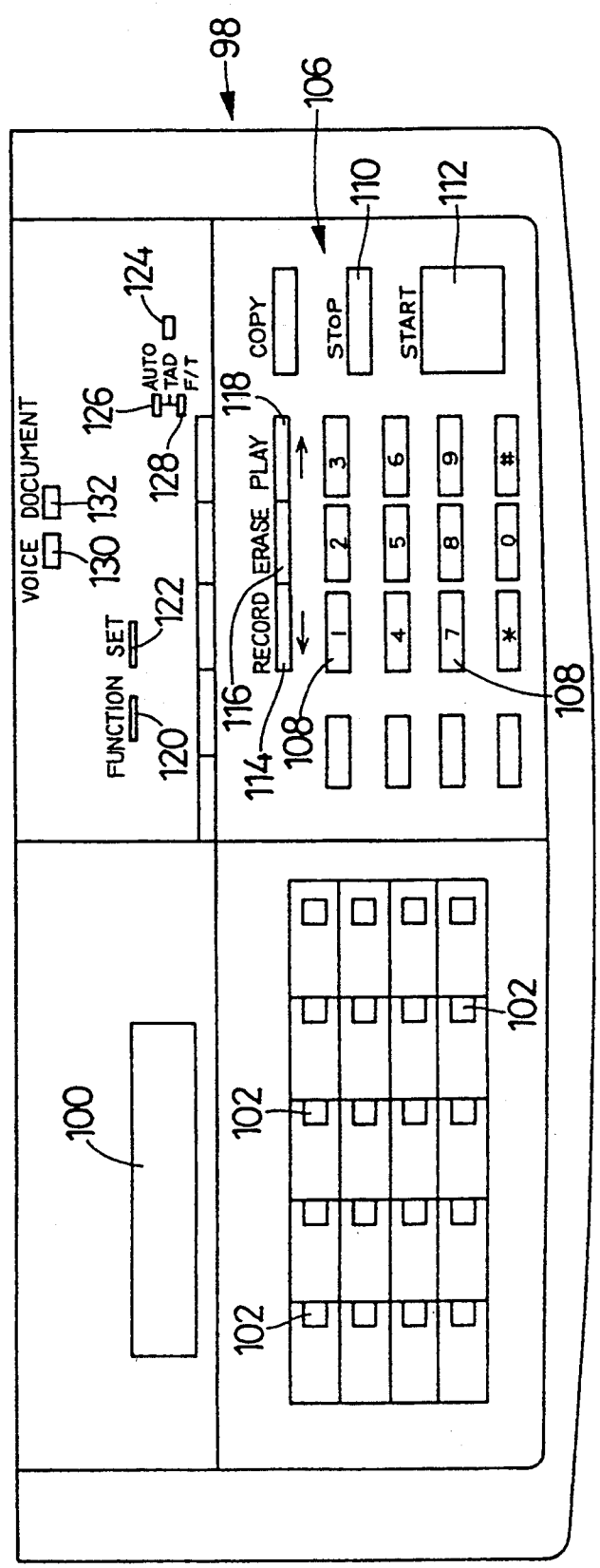
FIG. 3 is a plan view of the operation panel of the facsimile machine shown in FIG. 1.
Figure 5A:
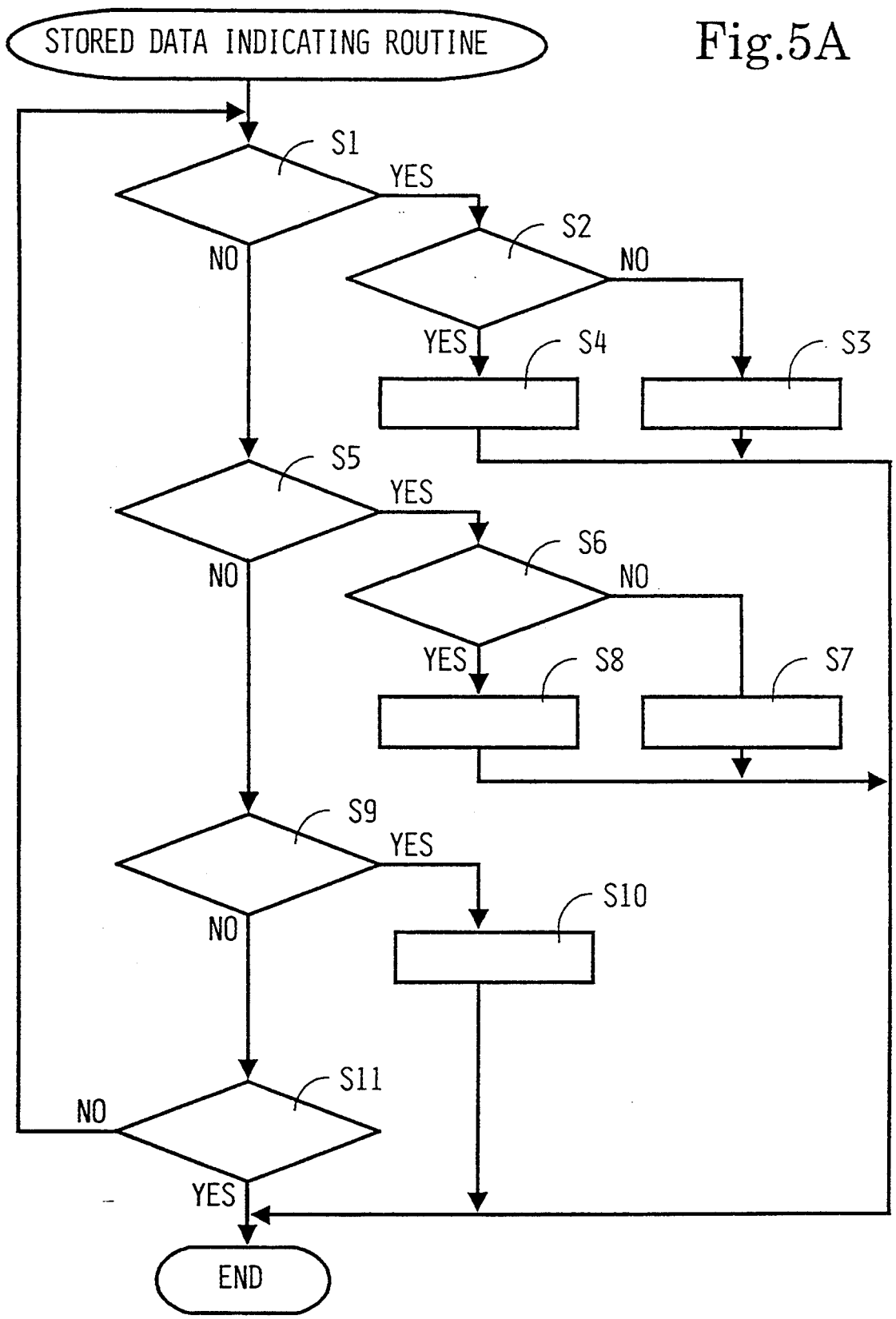
FIG. 5A is a flowchart for a storage data indicating routine which is stored in a ROM of a system control unit of the control device as shown in FIG. 4.

An operation panel 98 is provided on the upper cover 14 as shown in FIG. 3. A liquid crystal display 100 and a plurality of one-touch dial buttons 102 are provided in the left half of the operation panel 98 and a key board 106 is provided in the right half of the operation panel 98. The key board 106 includes various keys such as the ten number keys 108, a "STOP" key 110, a "START" key 112, a "RECORD" key 114, an "ERASE" key 116, and a "PLAY" key 118. At the upper right side of the key board 106 is a "FUNCTION" key 120, a "SET" key 122, a mode selection key 124, an "AUTO" lamp 126, a "FAX/TEL" lamp 128, a "VOICE" lamp 130, and a "DOCUMENT" lamp 132 are provided.

The "STOP" key 110 serves to instruct the cessation or termination of a processing being executed or a processing to be executed and the "START" key 112 serves to instruct the starting of a processing. The "RECORD" key 114 is used to instruct the recordation of image data on the recording sheet 18. The "ERASE" key 116 is used to instruct the erasure of digital data stored in a voice/image memory as described later and the "PLAY" key 118 is used to obtain the reproduction of stored voice digital data. The "RECORD" key 114 and the "PLAY" key 118 also function as cursor keys when they are used in conjunction with and after the "FUNCTION" key 120 or "ERASE" key 116 are depressed. The "FUNCTION" key 120 is used to instruct a display start of various functions which can be executed in the facsimile machine of the embodiment, and the "SET" key 122 is used to indicate the selection of one of the displayed plural functions.

The mode selection key 124 selects one of four modes (a) to (d): (a) an automatic mode for automatically receiving image data, (b) a manual mode for receiving image data on the basis of a user's operation, (c) a facsimile/telephone switching mode for automatically receiving data transmitted through one telephone line when the data is image data and for making a telephonic communication through a telephone receiver when the data is voice data, and (d) an automatic answering mode. If the automatic receiving mode is selected, the "AUTO" lamp 126 is turned on. If the facsimile/telephone switching mode is selected, the "FAX/TEL" lamp 128 is turned on. Further, if the manual mode is selected, neither the lamp 126 nor the lamp 128 is turned on, and if the automatic answering mode is selected, both of the lamps 126 and 128 are turned The "VOICE" lamp 130 and the "DOCUMENT" lamp 132 serve to indicate through their turn-on and turn-off operation the kind of digital data which can be stored in the voice/image memory and the kind of digital data which is currently stored.

The facsimile machine having the automatically answering telephone according to this embodiment is controlled by a control device 140 as shown in FIG. 4. The control device 140 includes a system control unit 142 equipped with a CPU 142A, a ROM 142B for storing programs, and a RAM 142C having working areas. The system control unit 142 is connected through a bus 144 to the operation panel 98, the recording device 30, the image read-out device 62, the voice/image memory 146, an EEPROM 148, a coding/decoding control unit 150, a communication control unit 152 and a voice recording/reproducing control unit 154. Omitted from FIG. 4, the system control unit 142 is also connected to the various kinds of devices required for the operation of the facsimile machine, such as the recording sheet leading edge sensor 32, the recording sheet discharge sensor 56, the original sensor 68, the original leading edge sensor 86, the recording sheet feeding device 28, and the original feeding device 74.

The voice/image memory 146 can store therein voice digital data representing voice messages and image digital data representing image messages, and is a part of the RAM 142C of the system control unit 142. The voice/image memory 146 is controlled based on a unit of four kilobytes by the CPU 142A when being accessed for storage and erasure. The unit of four kilobytes corresponds to a memory capacity of approximately a quarter of A4 size page of image digital data or approximately 1.5 seconds of voice digital data. The voice digital data includes answering voice digital data representing an answering message for answering a telephone call from an external source and business voice digital data representing a business message which is input from an external source. The answering voice digital data and the business voice digital data are discriminated from each other by adding discriminating data to these data.

The image digital data includes the image digital data transmitted from an external source and the image digital data obtained from reading the original 60. All of the data are stored in the voice/image memory 146. The voice digital data and the image digital data are provided with attribute data, such as a receiving date, a receiving time and information (ex. facsimile number or name) concerning a sender of the stored digital data respectively, and stored in the voice/image memory 146, so that the data can be discriminated from one another on the basis of the attribute data. The attribute data comprises eight bytes. In this facsimile machine, the business voice digital data is not erased even when it is reproduced. With respect to the image digital data, a first mode for erasing the image digital data simultaneously with the recording operation for that image digital data and a second mode for retaining in memory the image digital data without erasing it even when the image data is recorded are provided, and one of the modes is selected.

The EEPROM 148 is a memory for storing indication data that indicates the kind of the digital data to be stored in the voice/image memory 146, that is, it indicates whether the digital delta to be stored in the voice- /image memory 146 is voice digital data, image digital data or both.

The coding/decoding control unit 150 performs a coding operation on the digital data representing the image of the original 60 read out by the image read-out device 62 to compress the digital data and shorten the data transmission time. It also, serves to decode coded data input from an external source into corresponding digital data.

The communication control unit 152 communicates a facsimile signal with a remote facsimile machine and executes a control procedure. A modem 160 is connected to the communication control unit 152. The modem 160 includes a modulation/demodulation mechanism 166 for modulating an analog signal to a digital signal and outputting it through a net control unit 162 to an external line 164, and also demodulating an analog signal input from the external line 164 to a digital signal. The net control unit 162 automatically starts a data receiving operation in response to a call from the external line 164 and automatically starts its call to the remote site. The net control unit 162 is connected to a hand set 168 for inputting voice and a speaker 170 for outputting voice. When an automatically answering telephone is connected to the facsimile machine of this embodiment, it is connected to the net control unit 162.

The modem 160 includes a voice digitalizing circuit 174 for converting voice analog data to voice digital data and a voice reproducing circuit 176 for converting voice digital data to voice data.

The voice digitalizing circuit 174 and the voice reproducing circuit 176 of the modem 160 are controlled by the voice recording/reproducing control unit 154. The voice recording/reproducing control unit 154 serves to control the voice digitalizing circuit 174 to convert the voice analog data input from the hand set 168 and the external line 164 to the voice digital data and store the converted voice digital data in the voice/image memory 146. It also serves to read out the voice digital data from the voice/image memory 146 to reproduce the voice data using the voice reproducing circuit 176 and output the voice data to the speaker 170 or the external line 164.

The ROM 142B of the system control unit 142 contains a storage data indicating routine, a storage-instructed data display routine, a currently-stored data display routine and a stored data erasing routine as shown in FIGS. 5, 6, 7 and 10, respectively.

First, the indication of the type of the digital data to be stored in the voice/image memory 146, the display of the type of storage-instructed data and the display of the type of the currently-stored digital data will be described with reference to the routines as shown in FIGS. 5 to 8.

In the facsimile machine of this embodiment, the type of digital data to be stored in the voice/image memory 146 is indicated by a user's key manipulation and program processing as described later. For indicating the type of digital data, the user first pushes the "FUNCTION" key 120. Through this operation, the plurality of functions which are provided in the facsimile machine are displayed on the liquid crystal display 100. In this case, an item for the initialization of the various types of functions is selected by the user's manipulation of the ten keys 108. This item further includes plural menus, and by selecting a desired menu from the menus through the manipulation of the ten keys 108, a message "1. MEMORY USAGE" which represents an indication of the kind of the digital data to be stored into the voice/image memory 146 is displayed on the liquid crystal display 100.

Further, upon pushing the "SET" key 122, two messages "TAD ONLY", "SELECT>< & SET" which indicate the type of the digital data to be stored in the voice/image memory 146 are alternately displayed on the liquid crystal display 100 at 2-second intervals. Every time the "RECORD" key 114 or the "PLAY" key 118 is manipulated in the above state, the liquid crystal display 100 successively displays three types of messages, "COMBO" which represents storage of both voice digital data and image digital data in the voice/image memory 146, "TAD ONLY" which represents storage of only the voice digital data into the voice/image memory 146, and "FAX ONLY" which represents storage of only the image digital data.

That is, in the facsimile machine of the embodiment, one of the following three storage modes can be selectively indicated: a first storage mode for the case where the type of digital data to be stored in the voice/image memory 146 is only voice digital data, a second storage mode for the case where the type of digital data to be stored in the voice/image memory 146 is only image digital data, and a third storage mode for the case where the type of digital data to be stored in the voice/image memory 146 is both voice digital data and image digital data. The type of digital data to be stored is indicated by manipulating the "SET" key 122 in a state where a message representing a desired storage mode is displayed. Then, if the "STOP" key 110 is manipulated, the state is returned to a state before the "FUNCTION" key 120 is manipulated.

The storage data indicating routine is repetitively executed by manipulating the "RECORD" key 114 or the "PLAY" key 118 and the "SET" key 122 to indicate the execution of the kind of the digital data to be stored in the voice/image memory 146 during the above indicating operation. First, at a step S1 (steps are designated $Si_{i=1...,n}$), of FIG. 5, it is judged whether the storage of only the voice digital data into the voice/image memory 146 is indicated.

If "TAD ONLY" is selected from the three types of messages representing the type of digital data to be stored and displayed on the liquid crystal display 100 by the manipulation of the "SET" key 122 to thereby indicate the storage of only voice digital data, the judgment of step S1 is "YES". Then step 52 is executed to judge whether the storage of voice digital data can be indicated. This judgment is carried out on the basis of the judgment as to whether image digital data has been already stored in the voice/image memory 146. If image digital data has been already stored, the voice/image memory 146 is not used to store only voice digital data in the voice/image memory 146 and, thus, the judgment of step S2 is "NO" and at step S3 it is displayed on the liquid crystal display 100 that it is impossible to indicate the storage of only voice digital data.

If no image digital data has been already stored in the voice/image memory 146, the judgment of step S2 is "YES" and step S4 is executed to store into the EEPROM 148 the indication that only voice digital data is stored in the voice/image memory 146.

If the storage of only voice digital data is not indicated, the judgment of step S1 is "NO" and step S5 is executed to judge whether the storage of only image digital data is indicated. If the storage of image digital data is indicated, the judgment of step S5 is "YES" and at step S6 it is judged whether it is possible to indicate storage of only image digital data. This judgment is carried out on the basis of the judgment as to whether voice digital data representing a business message transmitted from an external source has been already stored in the voice/image memory 146. If voice digital data has been so stored, the voice/image memory 146 is not used to store only image digital data and, thus, the judgment of step S6 is "NO". Accordingly, at step S7 it is displayed on the liquid crystal display 100 that it is impossible to indicate the storage of only image digital data.

If voice digital data is not stored in the voice/image memory 146, the judgment of step S6 is "YES" and at step S8 the indication that only image digital data is stored into the voice/image memory 146 is stored in the EEPROM 148.

If the storage of only voice digital data or the storage of only image digital data is not instructed, step S9 is executed to judge whether the storage of both voice digital data and image digital data is indicated. If the storage of both data is indicated, the judgment of step S9 is "YES" and at step S10 the indication of the storage of both data is stored into the EEPROM 148. If the storage of both data is not indicated, the judgment of step S9 is "NO" and at step S11 it is judged whether the input is a cancel instruction. If no cancel instruction is made, the routine returns to step S1 while if a cancel instruction is made, the execution of the routine is terminated.

As described above, in the facsimile machine of this embodiment, the kind of the digital data to be stored in the voice/image memory 146 is indicated by the user's key manipulation and the execution of the storage data indicating routine. At the digital data storage time, the indicated content of the voice/image memory 146 which is stored in the EEPROM 148 is read out and the storage of data into the voice/image memory 146 is carried out in accordance with the read-out indication from the EEPROM 148.

The storage of the voice digital data is required only in the case where the facsimile machine of the embodiment is used in the automatic answering telephone mode. When the facsimile machine is used in modes other than the automatic answering telephone mode, upon calling, the user picks up the receiver 16 to make telephone conversation. Accordingly, in this case, the voice digital data is not stored, so that the voice/image memory 146 is substantially used for the storage of only image digital data and it is unnecessary to indicate the type of the digital data to be stored. Accordingly, only when the facsimile machine is used in the automatic answering telephone mode is it necessary that the storage of digital data be made in accordance with the indication of the type of digital data to be stored and, thus, the type of the storage-instructed digital data is indicated only when the facsimile machine is used in the automatic answering telephone mode.

Figure 6A:
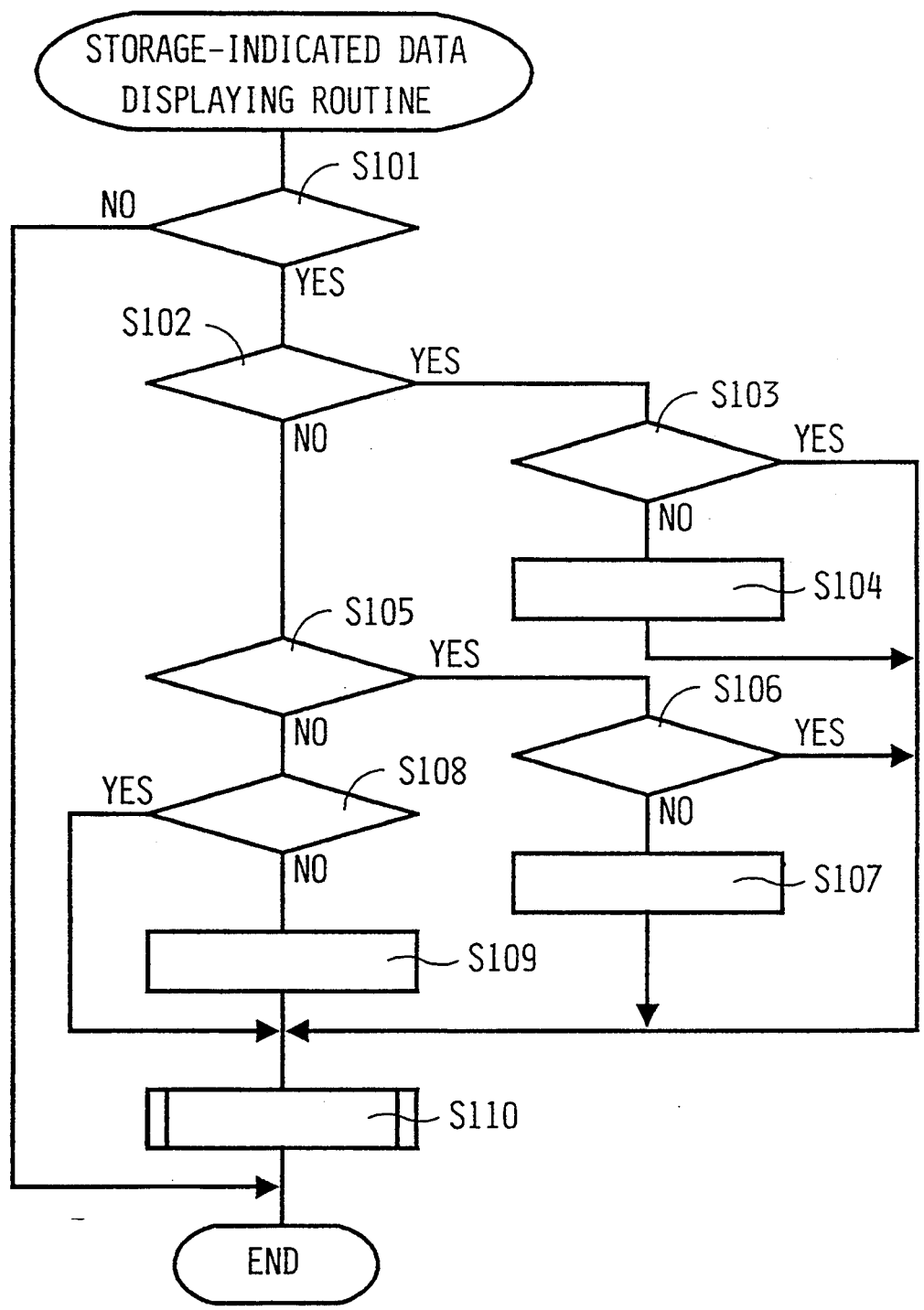
FIG. 6A is a flowchart for a storage indicating data display routine which is stored in the ROM.

Therefore, at step S101 of the storage-instructed data display routine, as shown in FIGS. 6A and 6B, it is first judged whether the used mode of the facsimile machine of the embodiment is the automatic answering telephone mode. If the used mode is not the automatic answering telephone mode, the judgment of step S101 is "NO" and the execution of the routine is terminated.

If the used mode is the automatic answering telephone mode, the judgment of step S101 is "YES". At step S102 it is judged whether the type of digital data to be stored in the voice/image memory 146 is specified to be voice digital data. This judgment is made by reading out from the EEPROM 148 the indication of the storage of the digital data to be stored into the voice/image memory 146. If the digital data to be stored is only voice digital data, the judgment of step S102 is "YES" and step S103 is executed to judge whether the storage of only voice digital data is currently displayed.

This judgment is made on the basis of the judgment as to whether the "VOICE" lamp 130 is turned on and the "DOCUMENT" lamp 132 is turned off. If the storage of only voice digital data is displayed, the judgment of step S103 is "YES", and the execution of the routine is terminated. If it is not displayed, the judgment of step S103 is "NO" and at step S104 the storage indication of only voice digital data in the voice/image memory 146 is displayed. That is, the "VOICE" lamp 130 is turned on, and the "DOCUMENT" lamp 132 is turned off. The process then executes step S110.

In step S102, if the storage indication of only voice digital data is not made, the judgment is "NO" and at step S105 it is judged whether the storage of only image digital data is indicated. If the storage of only image digital data is indicated, the judgment of step S105 is "YES" and at step S106 it is judged whether the storage indication of only image digital data is displayed.

This judgment is made on the basis of the judgment as to whether the "VOICE" lamp 130 is turned off and the "DOCUMENT" lamp 132 is turned on. If the storage indication is displayed, the judgment of step S106 is "YES" and the execution of the routine is terminated. If it is not displayed, the judgment of step S106 is "NO" and step S107 is executed to turn off the "VOICE" lamp 130 and turn on the "DOCUMENT" lamp 132 so that the storage indication of only image digital data is displayed. Thus, the process proceeds to step S101.

If the storage of both voice digital data and image digital data is indicated, both of the judgments in steps S102 and S105 are "NO" and at step S108 it is judged whether the storage indication of both digital data is displayed. That is, it is judged whether both the "VOICE" lamp 130 and the "DOCUMENT" lamp 132 are turned on. If both lamps 130, 132 are on the judgment of step S108 is "YES" and step S110 is executed. On the other hand, if both lamps 130, 132 are not on, the judgment of step S108 is "NO" and step S109 is executed to turn on the "VOICE" lamp 130 and the "DOCUMENT" lamp 132. Therefore, there is displayed the type of digital data to be stored in the voice/image memory 146 is both voice digital data and image digital data and step S110 is executed.

As described above, if the type of storage-instructed digital data is displayed using the "VOICE" lamp 130 and the "DOCUMENT" lamp 132, the user can easily know the type of digital data which can be currently stored into the voice/image memory 146 by looking at the "VOICE" lamp 130 and the "DOCUMENT" lamp 132. Accordingly, if the display is different from the digital data which is required to be stored, the type of digital data to be stored can be re-indicated.

Figure 7:
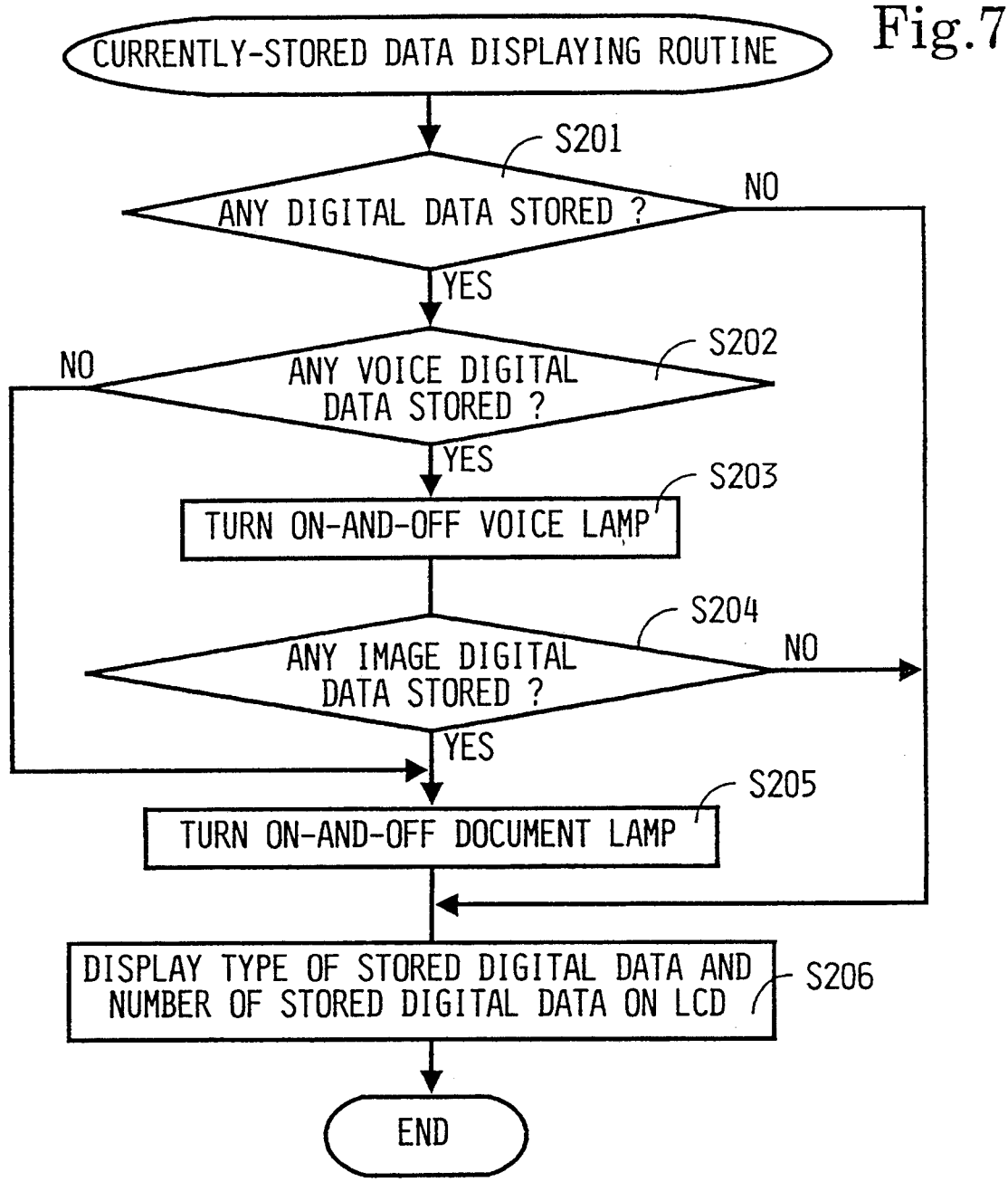
FIG. 7 is a flowchart for a current storage data display routine which is stored in the ROM.

After the execution of the step S109, step S110 is executed to display the kind of the digital data which is currently stored in the voice/image memory 146. This display is carried out in accordance with the currently-stored data display routine as shown in FIG. 7. First, at step S201 it is judged whether digital data is stored in the voice/image memory 146. If digital data is not so stored, the judgment of step S201 becomes "NO" and step S206 is executed to display on the liquid crystal display 100 that the number of stored communication cases is equal to zero.

If digital data is so stored, the judgment of step S201 is "YES" and step S202 is executed to judge whether the stored digital data is voice digital data. The judgment of step S202 is carried out on the basis of the attribute data which is provided to indicate whether the digital data is voice digital data or image digital data when the digital data is stored into the voice/image memory 146. If the digital data is voice digital data, the judgment of step S202 is "YES" and step S203 is executed to turn on and off, i.e., blink, the "VOICE" lamp 130, whereby it is displayed that voice digital data is currently stored in the voice/image memory 146. That is, the "VOICE" lamp 130 is turned on and off by the indication of the type of the stored digital data.

Figure 8:
FIG. 8 is a schematic view of a display of "storage numbers" of voice digital data and image digital data on a liquid crystal display of the facsimile machine.

Subsequently, step S204 is executed to judge whether image digital data is stored in the voice/image memory 146. If the image digital data is so stored, the judgment of step S204 is "YES" and step S205 is executed to turn on and off, i.e., blink, the "DOCUMENT" lamp 132. Thereafter, step S206 is executed to display the number of messages of stored voice digital data and the number of cases of stored image digital data on the liquid crystal display 100 as shown in FIG. 8. The number of messages of stored digital data can be determined from the attribute data.

In the case where voice digital data is stored, but image digital data is not stored in the voice/image memory 146, the judgment of step S204 is "NO" and at step S206 it is displayed on the liquid crystal display 100 that the number of messages of image digital data stored in the voice/image memory 146 is equal to zero and the number of messages of stored voice digital data is displayed on the display 100. Thereafter, the execution of the routine is terminated.

If voice digital data is not stored in the voice/image memory 146, the judgment of step S202 is "NO". In this case, only image digital data is stored in the voice/image memory 146 and step S205 is executed to turn on and off, i.e., blink, the "DOCUMENT" lamp 132. Subsequently, step S206 is executed to display the number of messages of stored voice digital data is equal to zero and also display the number of messages of stored image digital data, thereafter terminating the execution of the routine.

As described above, the type and number of messages of digital data which are currently stored in the voice-/image memory 146 are displayed, whereby the user can identify the type of the stored digital data, that is, whether the stored digital data is voice digital data or image digital data without being perplexed, and then output the stored digital data. Therefore, the output operation of the stored digital data by the user can be efficiently carried out. Further, if the number of stored messages is large, the operator knows that the remaining capacity of the voice/image memory 146 is probably small, and can take countermeasures such as erasure of unnecessary digital data.

FIG. 9 is a table showing various combinations of the turn-on, turn on-and-off (blink) and turn-off of the "VOICE" lamp 130 and the "DOCUMENT" lamp 132 in accordance with the type of the storage-instructed digital data and the type of the currently-stored digital data.

In the facsimile machine of the embodiment, whether the storage of the digital data whose type is indicated in the stored data indicating routine can be carried out is judged on the basis of the judgment as to whether it is different from the type of digital data which has been already stored in the voice/image memory 146, and the type of the storage-instructed digital data and the type of digital data stored in the voice/image memory 146 are made to be coincident with each other, so that the eight states, shown in FIG. 9, can be represented by providing the two lamps of the "VOICE" lamp 130 and the "DOCUMENT" lamp 132 to portray the storage indication and the actual storage from each other with their turn-on, turn-off and turn on-and-off operations.

For example, in the case where the type of digital data to be stored is indicated irrespective of the type of the digital data stored in the voice/image memory 146 before indication, even by providing two lamps and displaying the type of the digital data using the combination of the turn-on, turn on-and-off and turn-off thereof, both of the two lamps are turned on or turned on-and-off even when the type of digital data stored before the indication and the type of indicated digital data are different from each other. Therefore, two types of the storage indication of the digital data are displayed and, thus, the display is inconsistent with the actual storage indication.

However, in the facsimile machine of this embodiment, the indication and the display are consistent with each other, and by looking at the "VOICE" lamp 130 and the "DOCUMENT" lamp 132, the user can surely know the type of storage-instructed digital data and the presence or absence of the storage of the digital data whose type is indicated.

Figure 10:
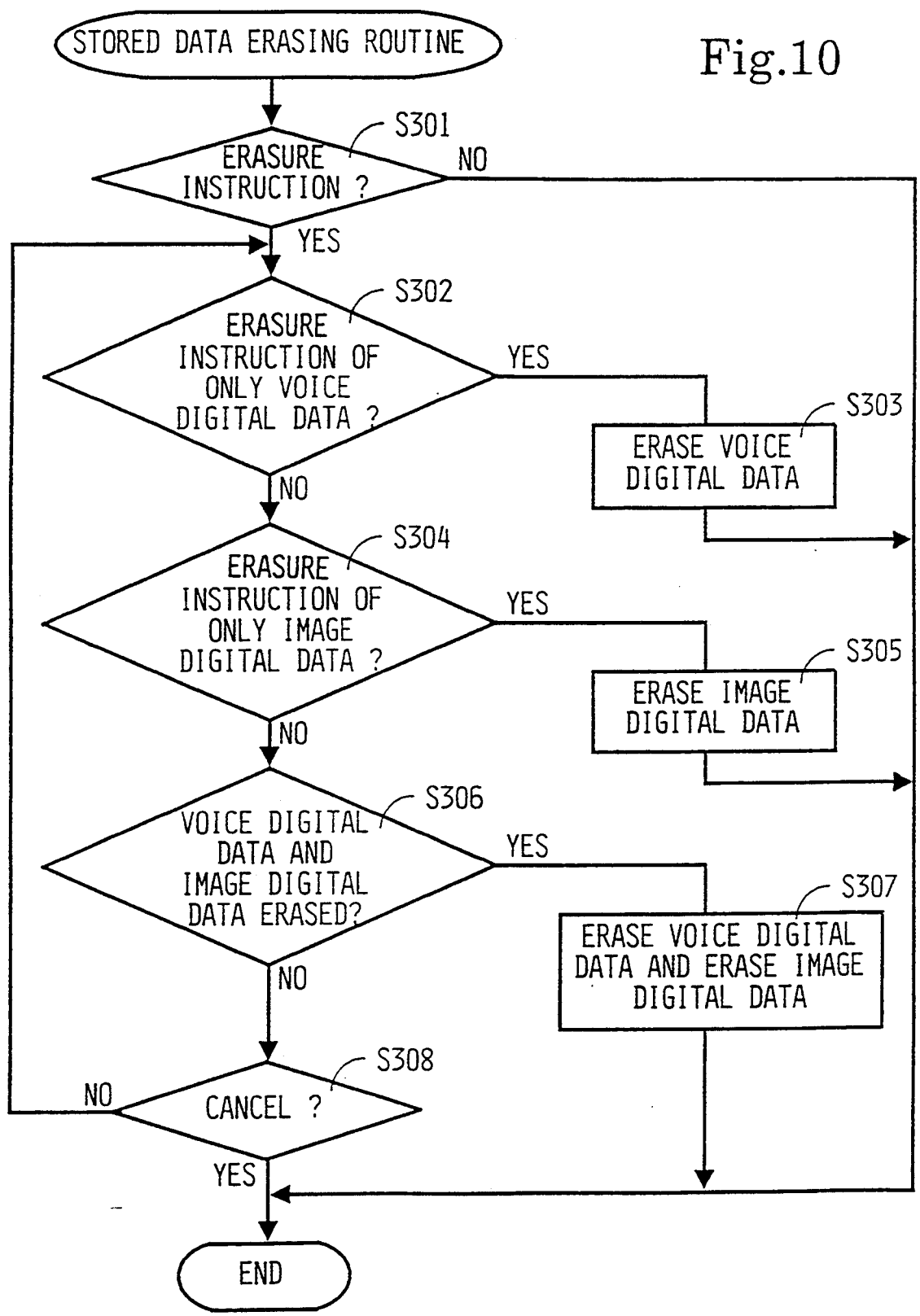
FIG. 10 is a flowchart for a storage data erasing routine which is stored in the ROM.

Next, the erasing operation of the digital data stored in the voice/image memory 146 in accordance with the stored data erasing routine as shown in FIG. 10 will be described. The stored data erasing routine is repetitively executed together with the other programs stored in the ROM 142B simultaneously with a switch-on of a power source.

In the facsimile machine of the embodiment, the type of digital data to be erased is indicated by the user. In the erasing operation, the user first pushes the "ERASE" key 116, so that a menu indicating the kind of the digital data to be erased is displayed on the liquid crystal display 100. The facsimile machine of this embodiment can be operated in three erasing modes: a first erasing mode for erasing voice digital data, a second erasing mode for erasing image digital data and a third erasing mode for erasing both of voice digital data and image digital data. The liquid crystal display 100 displays the three erasing menus representing the erasure of voice digital data, the erasure of image digital data and the erasure of both of voice digital data and image digital data, respectively. In this case, the voice digital data is business voice digital data representing a business message transmitted from an external source.

If the "ERASE" key 116 is manipulated, the "RECORD" key 114 and the "PLAY" key 118 function as cursor keys. Accordingly, the "RECORD" key 114 or the "PLAY" key 118 is manipulated to move the cursor and select one of the erasing menus. If a ten key 108 of "1" is pushed in a state where the cursor is moved onto a desired erasing menu, the erasure of the digital data of the erasing menu to which the cursor is moved is indicated. Further, if a ten key 108 of "2" or the "STOP" key 110 is pushed, the execution of the erasure is canceled.

In the stored data erasing routine, at step S301 it is judged whether an input instruction is an erasing instruction for instructing the erasure of the digital data stored in the voice/image memory 146. That is, it is judged whether the "ERASE" key 116 is manipulated. If the "ERASE" key 116 is not manipulated, the judgment of step S301 is "NO" and the execution of the routine is terminated.

If the input instruction is the erasing instruction, the judgment of S301 is "YES" and step S302 is executed to judge whether the digital data for which erasure is instructed by the "RECORD" key 114 and the "PLAY" key 118, functioning as the cursor keys and the ten key 108 of "1" is only the business voice digital data If it is the erasing instruction for only the business voice digital data, the judgment of step S302 is "YES" and step S303 is executed to erase the business digital data stored in the voice/image memory 146. That is, the business voice digital data is selected and erased from the digital data stored in the voice/image memory 146 on the basis of the attribute data.

If the erasure-instructed digital data is not only the business voice digital data, the judgment of step S302 is "NO". At step S304 it is judged whether the erasure-instructed digital data is only the image digital data. If the erasure of only the image digital data is instructed, the judgment of step S304 is "YES" and step S305 is executed to erase the image digital data stored in the voice/image memory 146. That is, the image digital data is selected and erased from the digital data stored in the voice/image memory 146 on the basis of the attribute data.

If the erasure of only the image digital data is not instructed, the judgment of step S304 is "NO" and at step S306 it is judged whether the erasure-instructed digital data corresponds to both of the voice and image digital data. If the erasure of both of the voice and image digital data is instructed, the judgment of step S306 is "YES" and step S307 is executed to erase the business voice digital data and the image digital data stored in the voice/image memory 146.

If the instruction is not an instruction of the type of digital data to be erased, the judgment of step S306 is "NO" and step S308 is executed to determine whether, through the operation of the ten key 108 of "2" or the "STOP" key 110, the cancellation of the erasure is instructed. If cancellation is instructed, the judgment of step S308 is "YES" and the execution of the routine is terminated. On the other hand, if the judgment of step S308 is "NO" the execution of the routine is returned to step S302.

As described above, according to the facsimile machine of this invention, even when the type of the digital data stored in the voice/image memory 146 is any one of the voice and image digital data, it can be erased upon instruction. In addition, when both of the voice and image digital data are erased, they can be simultaneously erased by only one operation. Therefore, the erasing operation can be easily and rapidly performed.

Further, the type of the digital data to be stored in the voice/image memory 146 can be indicated, and the type of storage-instructed digital data and the type of currently-stored digital data can be displayed. Accordingly, for example, by instructing the storage of image digital data in the automatical answering telephone mode, the voice/image memory 146 can be used for storage of image digital data, and thus a large amount of image digital data can be received. In addition, a large amount of voice digital data can be also received. Moreover, when the facsimile machine having the automatically answering telephone is used while connected to an automatically answering telephone, the voice/image memory 146 can be exclusively used for the storage of image digital data.

In this embodiment, if any digital data whose type is different from an indicated type that has been already stored in the voice/image memory 146, the indication is set as being impossible. Thus, the general rule is the digital data is stored in the voice/image memory 146 in an appropriate, allowable one of the three storage modes so that the recording of the image digital data and the reproduction of the voice digital data can be easily performed.

Further, in the facsimile machine of this embodiment, the type of digital data to be stored in the voice/image memory 146 can be indicated, and both of the type of storage-instructed digital data and the type of digital data which is currently stored in the voice/image memory 146 are displayed. In addition, the type of digital data stored in the voice/image memory 146 can be indicated and erased. Accordingly, both of the above functions can be conducted in combination with each other, whereby the operation performance of the machine improved.

For example, when the user desires to indicate only voice digital data as the kind of the digital data to be stored in the voice/image memory 146, this indication would be impossible if image digital data has been already stored in the voice/image memory 146. However, in this case, by erasing only image digital data, the storage of the voice digital data can be conducted. Further, the same is satisfied for the case where the voice/image memory 146 is desired to be used for storage of only image digital data when voice digital data has been already stored in the voice/image memory 146.

Further, in the automatic answering telephone mode, the type of digital data which is currently stored in the voice/image memory 146 is indicated through the turn on-and-off of the "VOICE" lamp 130 and the "DOCUMENT" lamp 132 and the display on the liquid crystal display 100. Accordingly, when the digital data is erased, the operator can erase a desired type of digital data without being perplexed with identification of the type of the stored digital data.

As is apparent from the foregoing, in the embodiment, the area for storing voice digital data in the voice/image memory 146 constitutes the voice digital data storing means, the area for storing the image digital data in the voice/image memory 146 constitutes the image digital data storing means, the area for storing the program corresponding to the processing of steps S301 to S307 in the ROM 142B of the system control unit 142 and the portion for executing these steps in the CPU 142A constitute the digital data erasing means, and the liquid crystal display 100, the "ERASE" key 116 and the ten keys 108 constitute the means for indicating the erasure mode.

In the above embodiment, the type of digital data to be erased is indicated by the manipulation of the plural keys such as the "ERASE" key 116, etc. However, the type of digital data may be indicated in various ways. For example, keys for indicating the execution of the three erasure menus as described above may be provided to instruct the erasure only through the manipulation of the keys. Further, the "RECORD" key 114 and the "PLAY" key 118 are also used as the cursor keys, however, keys for exclusive use as cursor keys may be provided.

Further, the facsimile machine of the above embodiment is so designed that the target to be erased is indicated and, even when a plurality of voice digital (image digital) data are stored, all of the data are erased. However, it may be so designed that plural voice digital data or image digital data are individually indicated for erasure rather than all at once.

For example, when plural image digital data are stored, a first portion of each of the image digital data and information on date and hour and a transmitter thereof are displayed on the liquid crystal display 100 to enable the operator to indicate unnecessary image digital data through key manipulation for erasure. Further, the erasure instruction of the image digital data to be erased is not limited to the instruction on the basis of the display thereof on the liquid crystal display 100. For example, the image digital data may be successively indicated and erased every predetermined number in an order from the oldest image digital data to the newest image digital data, or a month or period of image digital data to be erased is indicated to erase those image digital data which were stored in that month or period.

The same indication and erasure manner as described above can be carried out when plural voice digital data are stored. Further, in another manner, the user may be allowed to hear a first portion of each voice digital data so that he can indicate and erase unnecessary voice digital data.

Further, it may be adopted that the voice digital data and the image digital data are provided with serial numbers in a storage order and any unnecessary digital data is erased on the basis of the indication of the serial number thereof. In addition, when the erasure is instructed, the serial number, the date, the transmitter and the reception time are recorded on a recording sheet and the sheet is output so that the erasure decisions can be made on the basis of the sheet.

Still further, in the above embodiment, an image digital data group which is stored in the image memory 148 for transmission by the user and an image digital data group which is transmitted from a facsimile machine at a transmitter side and stored in the image memory 148 are erased on the basis of the erasure instruction of the image digital data. However, the facsimile machine may be so designed that at least one group of these digital data may be selectively erased.

Still further, the kind of the digital data to be stored in the voice/image memory 146 is indicated by both of the turn on-and-off of the "VOICE" lamp 130 and the "DOCUMENT" lamp 132 and the display of the liquid crystal display 110, and in combination with the area for storing the program corresponding to the processing at the steps S201 to S206 in the ROM 142B and the portion of the CPU 142A for executing these steps, the above indication operation constitutes the means for displaying the kind of the digital data which is currently stored in the voice/image memory 146. However, the indication may be made using only one of the turn on-and-off of the "VOICE" lamp 130 and the "DOCUMENT" lamp 132 and the display on the liquid crystal display 100.

Still further, in the above embodiment, both the indication of the type of storage-instructed digital data and the indication of the type of currently-stored digital data are made by the "VOICE" lamp 130 and the "DOCUMENT" lamp 132, and in combination with the area for storing the program corresponding to the processing at the steps S101 to S109 in the ROM 142B and the portion of the CPU 142A for executing these steps, the "VOICE" lamp 130 and the "DOCUMENT" lamp 132 constitute the means for displaying the kind of the digital data to be stored into the voice/image memory 146. However, these indications may be made by different lamps.

Still further, in the embodiment, when the mode is set to the automatic answering telephone mode, the digital data is stored in the voice/image memory 146 in accordance with the indication of the type of digital data to be stored. However, it may be adopted that in the other modes than the automatic answering telephone mode, the digital data may be also stored in accordance with the indication of the type. In this case, the type of storage-indicated digital data and the type of currently-stored digital data may be displayed.

In the above embodiment, the type of digital data to be stored is indicated by the user's key manipulation and the program processing based on the key manipulation and the ten key 108, the "FUNCTION" key 120, the "SET" key 122, the area for storing the program corresponding to the processing at the steps S1 to S10 in the ROM 142B and the portion of the CPU 142A for executing these steps constitute the means for indicating the storage mode of the digital data to be stored in the voice/image memory 146. However, the facsimile machine of the embodiment may be so designed that the storage mode is indicated through no key manipulation by the operator. For example, it may be so designed that the type of digital data to be stored is indicated on the basis of an indication transmitted from the external source through another telephone or the type of digital data to be stored is limited on the basis of the residual capacity of the voice/image memory. In this case, the type of digital data to be stored can be automatically indicated through no key manipulation on the main body of the facsimile machine. In the facsimile machine thus structured, the processing of the program for indicating the type of digital data to be stored constitutes the means for indicating the storage mode.

Further, in the above embodiment, whether the digital data whose type is indicated can be stored is judged on the basis of the judgment as to whether the digital data whose type is different from the indicated type can be stored, however, it may be judged on the basis of another criterion. For example, it is judged by a self-diagnosis device whether there is any abnormality in the storage function of the voice/image memory. If any abnormality is judged, the storage is judged to be impossible.

Still further, in the above embodiment, when the type of digital data to be stored in the voice/image memory 146 is indicated, the indication would be judged to be impossible if the digital data whose type is different from the indicated type have been already stored in the voice/image memory 146. However, the embodiment may be so modified that the type of digital data to be stored can be indicated irrespective of the type of digital data which is stored before the indication of the digital data to be stored. In this case, in a case where the type of the storage-indicated digital data and the type of digital data which is currently stored in the voice/image memory 146 are displayed with lamps, for example, two lamps are provided to portray every type of digital data. One of the lamps is used to display the presence or absence of an indication and the presence or absence of storage based on the indication while the other lamp is used to display the presence or absence of storage before the indication. In this case, by looking at the lamps, the operator can identify the indicated type of digital data and the type of stored digital data with no mistake.

Further, the embodiment may be so modified that one lamp is provided for each of the voice digital data and the image digital data respectively and the indicated type of digital data and the type of currently-stored digital data are displayed using one lamp through a switching operation by key manipulation.

Still further, in the above embodiment, at step S201 of the currently-stored data display routine, the stored number of messages of each of the voice digital data and the image digital data is displayed as "0" on the liquid crystal display 100 when no digital data is stored in the voice/image memory 146. However, the display on the liquid crystal display 100 as described above is not an indispensable operation, and it may be adopted such that no display on the liquid crystal display 100 is provided in the above case.

Still further, in the above embodiment, the type of digital data which is currently stored in the voice/image memory 146 and the number of messages are displayed. However, data for specifying the contents of the stored digital data, such as a head portion, a transmitter, date and hour at which the digital data is received, and a reception number, may be displayed on the liquid crystal display 100, then may be recorded on a recording sheet, or then may be presented with voice when the stored digital data are voice digital data.

Further, in place of the displaying operation of the type of digital data which is currently stored in the voice/image memory 146 and the number of messages thereof on the liquid crystal display 100 or in a combination of displaying operations, the kind and number of messages of the digital data which are contained in the currently-stored digital data and have not been reproduced or output even once may be displayed. In this case, the type and message number of the currently-stored digital data may be merely displayed or the information may be displayed together with data for specifying the contents of the stored digital data.

In the case where the data for specifying the content of each currently-stored digital data is displayed on the liquid crystal display 100, if the contents of all the digital data cannot be simultaneously displayed on the liquid crystal display 100, the screen of the display 100 may be scrolled to successively display each of the digital data.

Further, in the above embodiment, the displaying operation of the type of digital data for which the storage into the voice/image memory 146 is instructed and the displaying operation of the type of the currently-stored digital data are conducted. However, any one of the displaying operations may be selectively conducted.

Still further, in the above embodiment, the digital data storing means is provided by the RAM 142C of the system control unit 142. However, in place of the RAM 142C, an external storage medium which is detachably installed in the facsimile machine, such as a magnetic disc, may be used as the digital data storing means.

The invention may be also implemented in combination with the various modifications as described above.

Further, the invention is applicable to not only a data storage device for use in a facsimile machine for receiving voice data and image data through a telephone line, but also to a data storage device for use in a device having a function of processing both of voice data and image data, such as a facsimile machine for transmitting and receiving data in digital form through a facsimile communication network, and a device which has no transmission function, but has a data receiving and reproducing function for voice data and image data.

In addition, the invention can be implemented with other various modifications and improvements without departing from the subject matter of the invention.

What is claimed is:

1. A data storage device, comprising:
   digital data storing means for storing both voice digital data of voice messages and image digital data of image messages; and
   storage mode indicating means for conducting a selective storage mode indication of at least two storage modes from multiple storage modes, the multiple storage modes including a first storage mode in which the type of digital data to be stored into the digital data storing means is limited to only voice digital data, a second storage mode in which the type of digital data to be stored into the digital data storing means is limited to only image digital data and a third storage mode in which the type of digital data to be stored into the digital data storing means is both voice digital data and image digital data.

2. A data storage device as claimed in claim 1, further comprising:
   storage-indicated data display means for displaying the type of digital data which is to be stored in a storage mode indicated by the storage mode indicating means.

3. A data storage device as claimed in claim 2, further comprising:
   currently-stored data display means for displaying the type of digital data which is currently stored in the digital data storing means.

4. A data storage device as claimed in claim 1, further comprising:
   currently-stored data display means for displaying the type of digital data which is currently stored in the digital data storing means.

5. An apparatus for storing data, comprising:
   a digital data storing memory for storing a selected type of digital data from a group of types of digital data consisting of voice digital data, image digital data and both voice digital data and image digital data;
   control means for controlling operation of the apparatus;
   selection means for selecting the type of digital data to which digital data stored in said digital data storing means is limited; and
   indication means for indicating the type of digital data selected for storage using said selection means.

6. The apparatus as claimed in claim 5, further comprising an electronic erasable programmable read only memory for storing the type of digital data that can be stored in said digital data storing memory.

7. The apparatus as claimed in claim 5, wherein said selection means permits selecting a one of voice digital data, image digital data and both of voice and image digital data for storage in said digital data storing means.

8. The apparatus as claimed in claim 7, further comprising means for determining whether digital data is already stored in said digital data storing memory, wherein if digital data is so stored, the type of already stored digital data is determined and a further determination is made whether the type of digital data selected using said selection means is the same as the type of already stored digital data.

9. The apparatus as claimed in claim 8, further comprising display means for presenting messages.

10. The apparatus as claimed in claim 9, wherein when the type of already stored digital data and the type of digital data selected as the type of digital data to be stored do not agree, a message so indicating is presented on said display screen.

11. The apparatus as claimed in claim 9, wherein when the type of already stored digital data and the type of digital data selected as the type of digital data to be stored agree, said indication means is operated.

12. The apparatus as claimed in claim 11, further comprising an electronic erasable programmable read only memory, wherein when the type of digital data agree, said electronic erasable programmable read only memory stores the type of digital data that can be stored in said digital data storing memory.

13. The apparatus as claimed in claim 5, wherein said indication means has an operating mode for indicating the type of digital data stored in said digital data storing means.

14. The apparatus as claimed in claim 12, wherein said indication means has an operating mode for indicating the type of digital data stored in said digital data storing means.

* * * * *